Nov. 21, 1972   J. L. RICH   3,703,430
APPARATUS FOR FABRICATING PLASTIC CUSHIONING
AND INSULATING MATERIAL
Filed March 12, 1971   3 Sheets-Sheet 1

INVENTOR
JOSEPH L. RICH

BY *Edward M. Trenan*
ATTORNEY

Nov. 21, 1972  J. L. RICH  3,703,430
APPARATUS FOR FABRICATING PLASTIC CUSHIONING
AND INSULATING MATERIAL
Filed March 12, 1971  3 Sheets-Sheet 3

INVENTOR
JOSEPH L. RICH

BY
ATTORNEY

United States Patent Office 3,703,430
Patented Nov. 21, 1972

3,703,430
APPARATUS FOR FABRICATING PLASTIC
CUSHIONING AND INSULATING MATERIAL
Joseph L. Rich, 3010 Judith Drive,
Merrick, N.Y. 11566
Filed Mar. 12, 1971, Ser. No. 123,732
Int. Cl. B32b 31/00
U.S. Cl. 156—497                                8 Claims

ABSTRACT OF THE DISCLOSURE

Layers of heat sealable sheet material are passed on opposite sides of a blower to axially spaced pairs of rotating rollers which form seams joining the layers while an air filled passage is maintained between each pair of longitudinal seams. The longitudinally seamed sheet material is passed through a pair of rotating rollers one or both of which have surface recesses forming transverse seams dividing the passages into closed, sealed, expanded, air filled cells.

---

This invention concerns a method and apparatus for manufacturing a cushioning and insulating material and more specifically concerns a cushioning material formed of two layers of plastic material having sealed areas defining closed air cells or pockets.

Cushioning an insulating material formed of layers of plastic material joined together to form closed pockets have heretofore been manufactured with rather large, complex and expensive machines. It was necessary to provide means for applying suction to form the areas in the sheet material while heat was applied to seal the layers together and separate machines were required to form the cushioning material in different widths. For these reasons a large capital outlay was required and thus such machines were available only in plants where the plastic sheet material was made. The present invention makes it practical to make insulating and cushioning material of any desired width locally at the point of use rather than in the plant where the sheet material is manufactured from raw chemical ingredients.

According to the invention, apparatus of simplified construction is provided in which two layers of sheet material are fed to axially spaced pairs of rollers between which air is blown while laterally spaced longitudinal seams are formed. The longitudinally seamed sheet material is fed to another pair of cooperating rollers having recesses which form transverse seams creating closed, sealed, air-filled, expanded cells. The rollers may be heated for heat sealing thermoplastic or thermally sealable layers of plastic film.

Accordingly, it is a principal object of this invention to provide a new and improved method and apparatus for the manufacture of cushioning materials.

Another object of the present invention is to provide a new and improved method and apparatus for manufacturing cushioning material wherein the number of cells across the width can be easily changed.

These and other objects and many of the attendant advantages of this invention will be readily appreciated as the same becomes better understood by reference to the following detailed description when considered in connection with the accompanying drawings in which.

Figure 1:
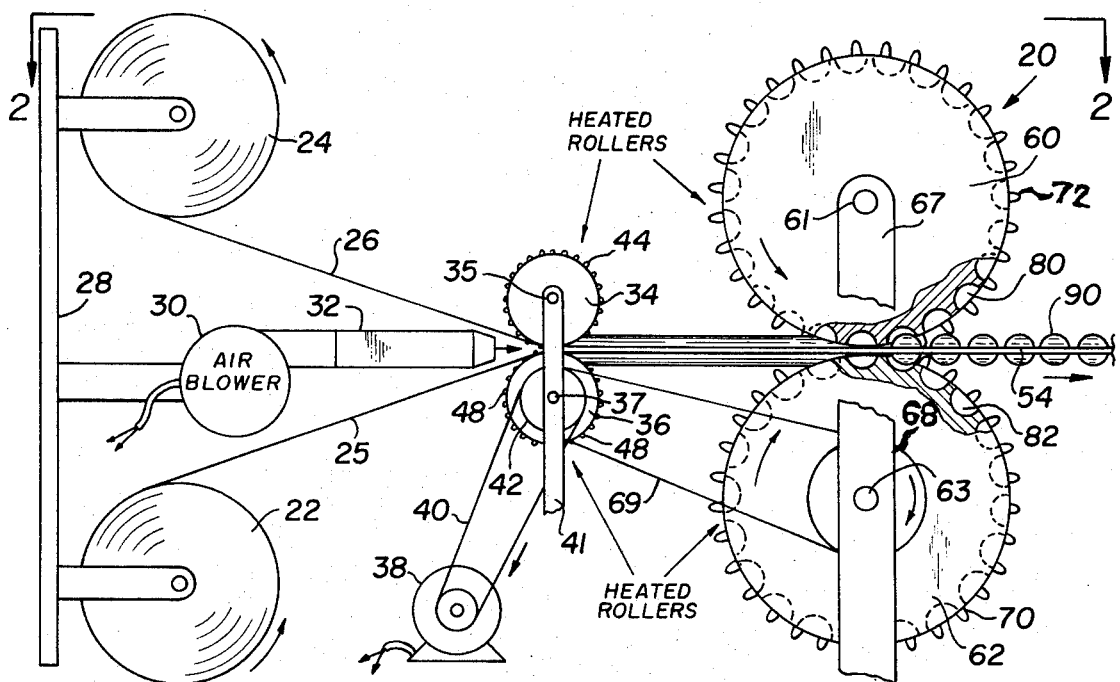
FIG. 1 is a side view diagrammatic in form with parts broken away of apparatus embodying the invention.

Referring now to the drawings wherein like reference characters designate like or corresponding parts throughout, there is illustrated in FIGS. 1–4 an apparatus generally designated as reference numeral 20 comprising a pair of rolls 22, 24, each having a thin thermoplastic film 25, 26 such as polyethylene. The rolls 22, 24 are carried on a stand 28 which also carries an air blower 30. This blower has a wide nozzle 32 which directs an air stream between the sheets of film drawn off the rotating rolls. The film sheets are drawn between a plurality of pairs of narrow heated rollers 34, 36 disposed respectively above and below the thermoplastic films 26 and 25 respectively. The rollers 34 and 36 are rotatably carried by respective shafts 35, 37 on respective lateral supports or brackets 39, 41. Rollers 34, 36 are driven by a motor 38 operatively connected by a drive belt or chain 40 to a pulley or a sprocket 42 on the shaft 37 of the roller 36. The shaft 35 carries a gear 44 which meshes with a gear 48 on the shaft 37 and thus by this arrangement both rollers rotate in opposite directions. The shafts 35 and 37 carry electric heaters 50 (FIG. 2) which heat the rollers with each heater energized via a brush 51 and a slip ring 52 from an external power supply (not shown).

The heated rollers 34, 36 form parallel longitudinal seals 54 (FIG. 2) which define a plurality of tubes 56 (FIG. 4) between the film sheets or layers 25, 26. The air stream maintained by blower 30 divides and expands the tubes 56 as clearly shown in FIG. 4. The air channels or bubbles produced by the air streams are maintained until the film sheets pass between a pair of large heated rollers 60, 62. The rollers 60, 62 are carried by respective shafts 61, 63 on respective bracket supports 66, 67. A pulley or sprocket 68 on the shaft 62 is driven by a belt or chain 69 from the pulley or sprocket 42. A drive gear 70 on the shaft 63 meshes with a gear 72 on the shaft 61 and thus by this arrangement both rollers 60 and 62 rotate in opposite directions. The shafts 61, 63 carry electric heaters 75 each energized by a slip ring 76 and a brush 77 from a remote power supply (not shown).

Figure 5:
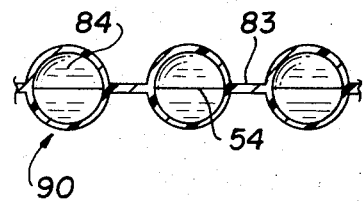
FIG. 5 is a fragmentary sectional view on an enlarged scale taken along line 5—5 of FIG. 2, showing air cells or pockets in the plastic material.

Rollers 60 and 62 are both formed with a multiplicity of recesses or pockets 80, 82 formed in their outer cylindrical sides, with the recesses having registering rims 81. The heated rollers 60, 62 compress the expanded tubes 56 and form transverse seals 83 at opposite sides thereof to define closed cells or pockets 84 as clearly shown in FIG. 5. The sealed pockets 84 contain air so they remain in expanded form. The cushioning material 90 comes out of the apparatus at the right end as shown in FIG. 1 and can be cut into any desired length.

Figure 6:
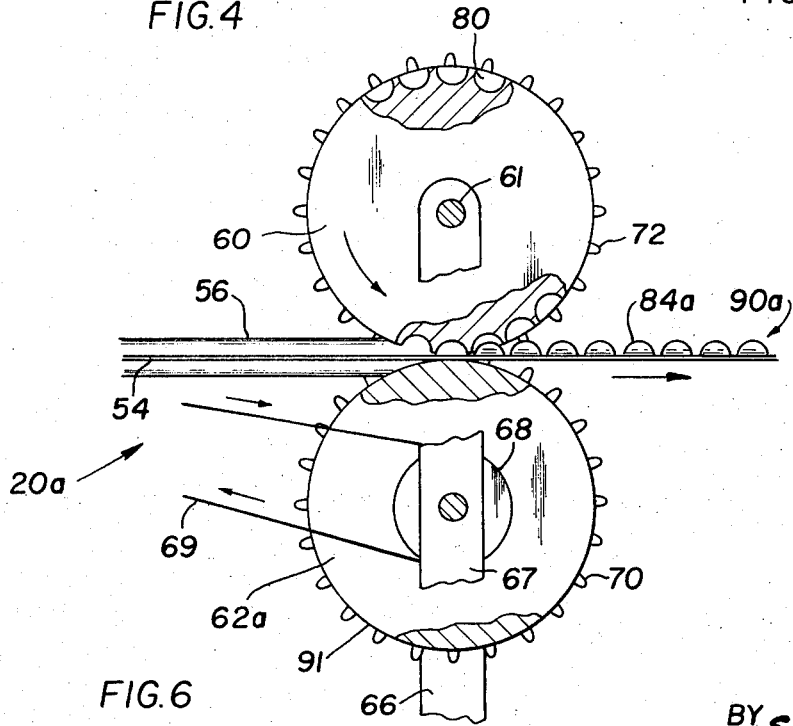
FIG. 6 is a side view of part of another assembly of apparatus embodying a modification of the invention.
Figure 7:
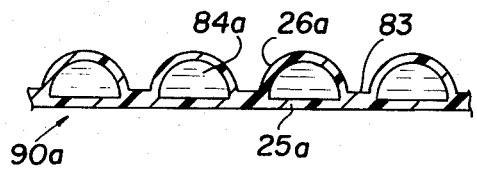
FIG. 7 is a cross sectional view similar to FIG. 5, showing air cells or pockets in the plastic material formed by using the apparatus of FIG. 6.

FIG. 6 shows parts of another apparatus generally designated as reference numeral 20a which is substantially the same as the apparatus 20 but as illustrated therein a roller 62a has a smooth external cylindrical surface or side 91. The pockets or recesses 82 provided in the roller 62 (FIGS. 2 and 3) are omitted in the roller 62a. As a result closed cells 84a in a cushioning material 90a defined by the seals 54 and 83 have a lower flat side defined by bottom film 25a, while an upper film 26a forms the upper convex portions of the cells; see FIG. 7. The apparatus 20 and 20a produce cells which are generally rectangular in plan view as clearly shown in FIG. 2.

Figure 2:
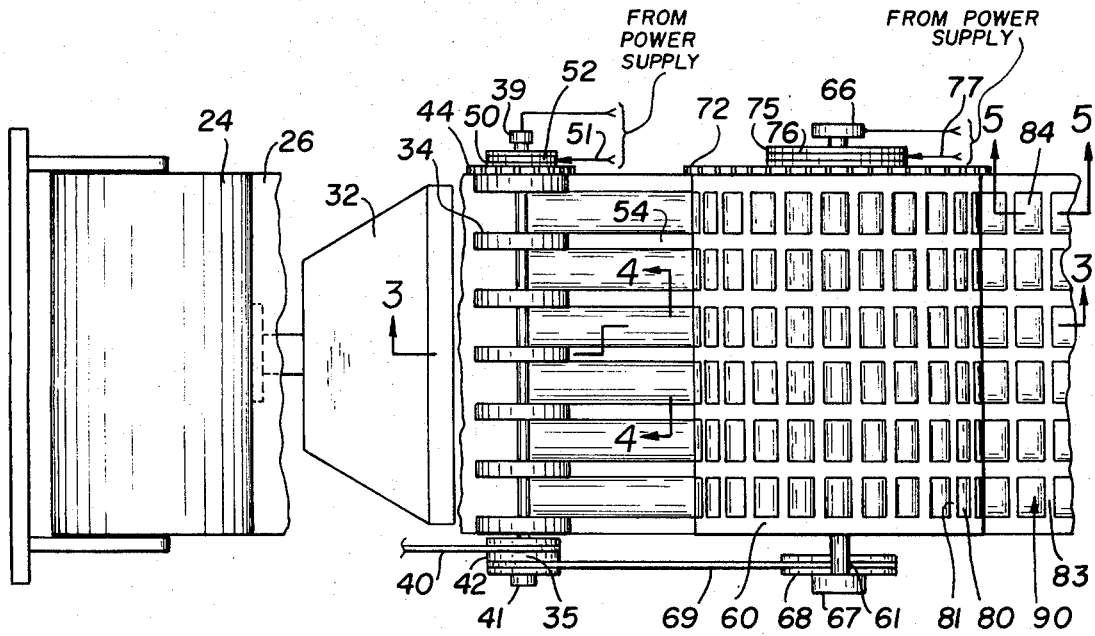
FIG. 2 is a fragmentary top plan view taken along line 2—2 of FIG. 1.
Figure 3:
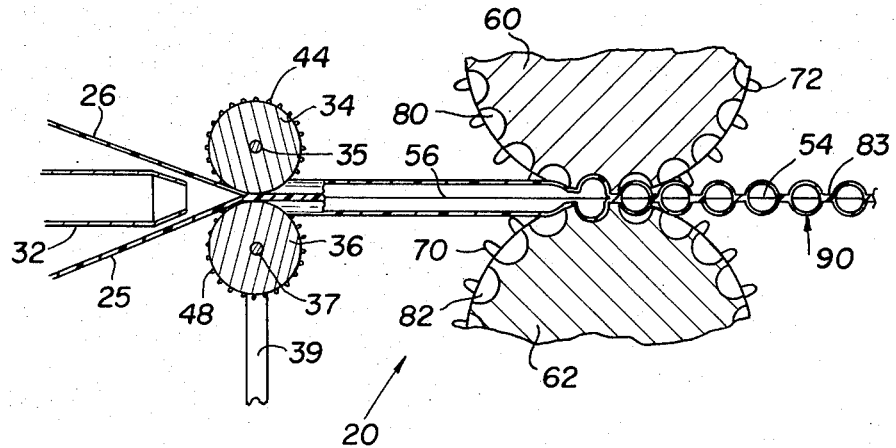
FIG. 3 is a fragmentary vertical sectional view taken along line 3—3 of FIG. 2.
Figure 4:
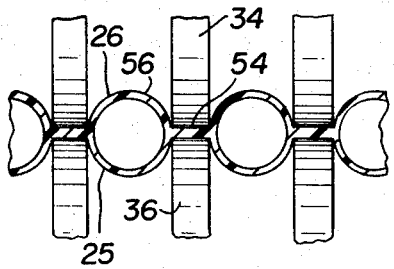
FIG. 4 is a fragmenatry sectional view on an enlarged scale taken along line 4—4 of FIG. 2, showing air bubbles or channels in the plastic material formed during the process according to the invention.

While only seven pairs of rollers 34, 36 are employed in the apparatus as shown in FIG. 2, it will be apparent that more or less pairs of rollers may be employed depending on the width of cushioning material to be produced. The material may have the width of a single cell or it may have any desired number of cells side-by-side across the material. The width of the material will depend on the width of the film on the rolls 22, 24.

Figure 8:
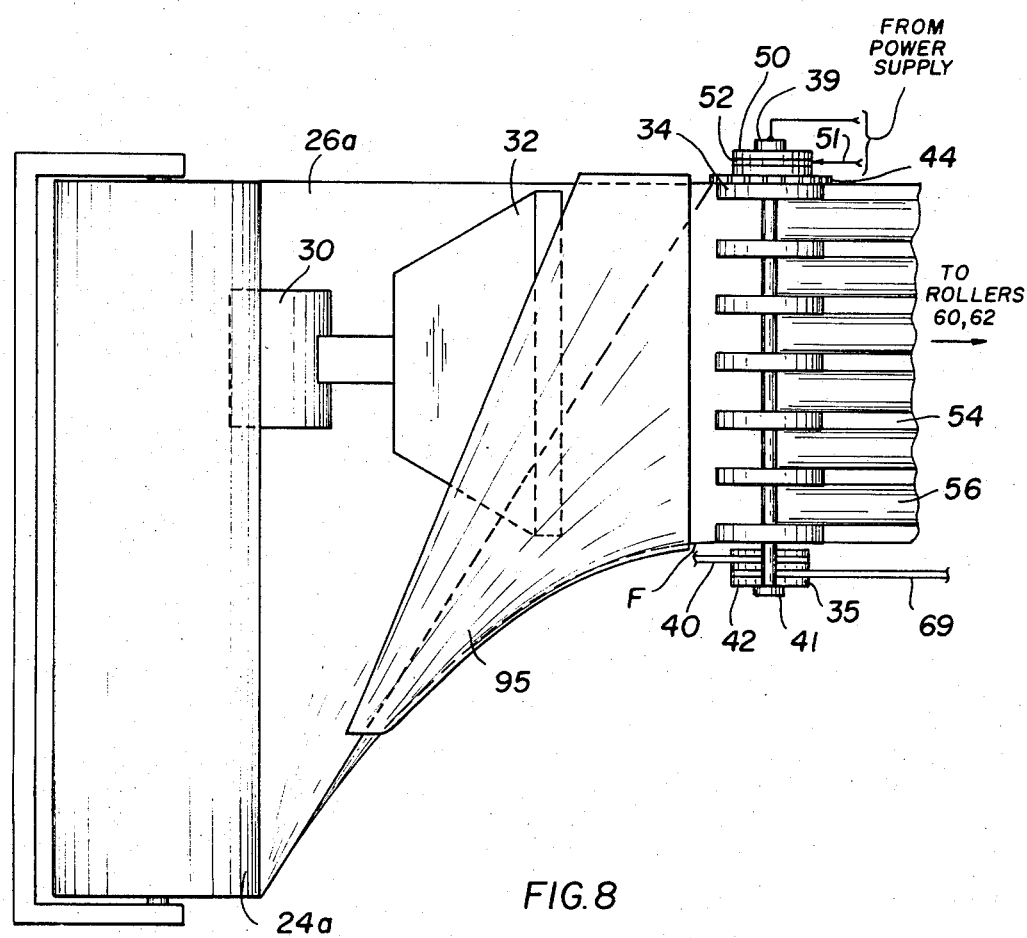
FIG. 8 is a plan view of part of a further assembly of apparatus according to the invention.

It is possible to employ only a single supply roll 24a of plastic film in the apparatus, 20b shown in FIG. 8. The film 26a will be folded in half on fold line F by a suitable folding device or scroll 95 as it comes off the roll 24a and is fed to rollers 34, 36. Blower 30 will maintain the expanded tubes 56 between both sides of the folder sheet fed to the cell forming rollers 60, 62.

All forms of apparatus described, make it possible to produce cushioning material locally in locations where needed. The material may be used where cartons are being packed with fragile articles and only as much cushioning material as is needed may be made. The cushioning material may be used for thermal or acoustic insulation in building construction, vehicle bodies, appliances such a refrigerators and freezers, etc. In any case, the use of prior loose insulation material can be avoided. Shipment and storage of bulky insulation material heretofore required by users of such cushioning and insulation material can also be avoided with large consequent savings in expense, labor, storage and handling facilities, etc. The apparatus is relatively simple in construction and can be assembled at relatively low cost.

It should be understood that the foregoing relates to only a limited number of embodiments of the invention, which have been by way of example only, and that it is intended to cover all changes and modifications of the examples of the invention herein chosen for the purposes of the disclosure, which do not constitute departures from the spirit and scope of the invention.

The invention claimed is:

1. Apparatus for continuously making multicellular, seamed, cushioning and insulating sheet material, comprising
    at least two spaced pairs of axially parallel first rollers;
    a first support means for rotatably supporting said first pairs of rollers for passage of two layers of sealable sheet material between the first roller of each of said pairs thereof to form parallel, longitudinal seams joining the layers;
    a blower means disposed before and adjacent said first pairs of rollers and arranged to blow air between the layers of sheet material to create and maintain a longitudinally extending, expanded passage between each pair of longitudinal seams;
    a pair of axially parallel second rollers spaced from said first pairs of rollers;
    a second support means for rotatably supporting said second pairs of rollers for passing the longitudinally seamed sheet material therebetween, and wherein at least a first one of the rollers of said second pairs has an array of recesses therein with rims shaped to thereby form a series of transverse seams dividing the longitudinally expanded passage into a series of closed, sealed, expanded, air-filled cells when the layers are passed between said second pairs of rollers; and
    motor means arranged to rotate the rollers in each pair thereof in opposite directions for passing said sheet material therebetween.

2. Apparatus as defined in claim 1, wherein said sheet material is thermally sealable, said apparatus further comprising means for heating said rollers to form the longitudinal and transverse seams thermally when said rollers rotate.

3. Apparatus as defined in claim 1, wherein the second roller of said second pairs of rollers has a smooth cylindrical surface so that one side of the seamed sheet material is flat and the cells extend outwardly of the other side of the seamed sheet material.

4. Apparatus as defined in claim 1, wherein the second roller of said second pairs of rollers is formed with another array of recesses having rims registering with the rims of the recesses of said first roller of said second pair of rollers whereby the walls of said cells extend outwardly of both sides of the seamed sheet material.

5. Apparatus as defined in claim 1, further comprising means for rotatably supporting a pair of rolls of said sheet material for feeding two layers of said sheet material between said first and second pairs of rollers.

6. Apparatus as defined in claim 1, further comprising support means for rotatably supporting a single roll of said sheet material; and folding means disposed between said support means and said first pairs of rollers for folding said sheet to form said two layers.

7. Apparatus as defined in claim 1, further comprising another support means for passing said two layers of sheet material at opposite sides of said blower means to said first pairs of rollers.

8. Apparatus as defined in claim 1, wherein the number of pairs of first rollers is more than two so that more than two laterally spaced longitudinal seams are formed to join the layers of sheet material.

References Cited

UNITED STATES PATENTS

| | | | |
|---|---|---|---|
| 3,011,930 | 12/1961 | Dworak | 161—127 |
| 3,405,502 | 10/1968 | Badder | 156—553 |
| 2,262,493 | 11/1941 | Guinzburg | 156—290 |
| 2,410,744 | 11/1946 | Powers | 161—127 |

DOUGLAS J. DRUMMOND, Primary Examiner

U.S. Cl. X.R.

156—553, 582